2,835,556
PARTIAL OXIDATION OF HCN

Leslie G. Boatright and William F. Marzluff, Stamford, Conn., assignors to American Cyanamid Company, New York, N. Y., a corporation of Maine No Drawing. Application September 18, 1953
Serial No. 381,138

4 Claims. (Cl. 23—190)

The present invention is directed to the preparation of cyanamide and/or melamine.

It has been found that when a vapor mixture of hydrocyanic acid and oxygen is heated to a temperature of at least 350° C. in contact with an inert, inorganic heat-stable highly porous material of high surface area (e. g., silica gel) melamine and cyanamide are formed on the material. If the vapor stream also contains ammonia, the melamine formed on the material is sublimed therefrom into the vapor stream in good yield, from which it can be condensed and collected.

The following examples illustrate the invention.

EXAMPLE 1

A vapor mixture of HCN in dry air in which the $HCN:O_2$ mole ratio was 2:1 was passed at the rate of 220 cc. per minute through 100 g. of 28–100 mesh silica gel in a vertical heat-resistant glass reactor maintained at 450–550° C. for 83 minutes. The silica was then cooled and leached with water to recover the cyanamide formed. A 67% yield of cyanamide was obtained based on the HCN consumed, assuming the following overall equation:

$$2HCN + O_2 \rightarrow H_2NCN + CO_2$$

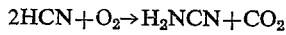

A small amount of melamine was collected at the exit end of the reaction tube together with a little free cyanamide.

EXAMPLE 2

The general procedure of Example 1 was followed. The vapor feed was the same, except that ammonia in the amount of 900 cc./min. was added thereto. The catalyst was 100 g. of silica gel coated with silver oxide. The reactor was heated at 400° C. for 2 hours and the melamine sublimate collected in a vessel maintained at 100° C. (to prevent condensation of ammonium carbamate). In this run the yield of melamine was about 40% calculated on the HCN consumed.

When the reaction is carried out in the range of about 350°–450° C., the initial product is predominantly melamine, with a little cyanamide. If no ammonia is added to the vapor stream passing through the catalyst, the melamine on the catalyst is decomposed gradually to cyanamide and also to some extent to melam, etc. Therefore to get a good yield of melamine, it is preferred to remove it from the catalyst as it is formed. A convenient way of removal is to sublime it from the catalyst surface by adding ammonia to the vapor stream passing through the catalyst. Such ammonia may suitably comprise from 5 to 50% or more of the vapor stream volume. The melamine-containing vapor can then be passed into a condenser maintained at a temperature above the condensation point of ammonium carbamate in order to condense the melamine.

To the extent that the reaction temperature exceeds about 400° C., the formation of cyanamide is proportionately increased, owing at least in part to the depolymerization of melamine on the catalyst surface. Above 500° C. any melamine formed is converted almost instantly to cyanamide. Accordingly, when the process is to be operated to give a high yield of cyanamide, temperatures of at least 450° C. should be used, and preferably higher. The cyanamide on the catalyst can be later removed by leaching the reaction mass with any of the known cyanamide solvents.

The HCN:oxygen mole ratio is preferably stoichiometric i. e., 2:1, but the ratio is not critical and may be varied widely. Any unreacted material can be collected and recycled.

The catalyst

It has been found that virtually any inert adsorptive material of high internal surface and/or volume can be adapted to serve as a catalyst in the conversion of HCN to cyanamide and its polymers. The action appears to be induced best by materials of high surface area in which a considerable amount of the surface is actually in the form of the walls of innumerable submicroscopic capillaries. The activated oxide gels of the amphoteric elements qualify admirably in this respect. For example, it is well known how to prepare gels of silica and alumina such that the internal volume of a given particle is considerably more than half the apparent volume of the particle. The same techniques have been widely utilized in the past for preparing activated gels of titania, zirconia, thoria, and the like. There are also many naturally occurring adsorbents available commercially in activated form that have been found suitable. These include pumice, diatomite, infusorial earth, and the like, which inherently possess the desired amorphous silica structure and can therefore be activated by reduction of the water content. Others, such as the clays and clay-like materials, e. g. kaolin, bentonite, bauite, and fuller's earth, are customarily activated by an acid wash prior to thermal dehydration, thereby depositing in situ on each flake or particle of material a layer of silica and/or alumina gel.

The structures of gels of silica, silica-alumina and the like can be varied by various pre-treatments to give materials having predominantly pores of a large size or any intermediate diameter from 60 to 70 A. to very low values. Also, the gels in question can have surface areas covering the range of 180–650 m.²/g. Gels having specific surfaces of 600 m.²/g. and pore volumes of 0.9 cc./g. have been found satisfactory as have gels having surfaces of 450 m.²/g. and pore volumes of 0.26 cc./g. These are not to be construed as limits of workability of the gels but only as examples of the variations in structure possible.

As normally prepared, the activated catalysts may carry 2–20% by weight of adsorbed water. It is neither necessary nor desirable to remove all of this water (as by preliminary strong heating). In fact, heating silica gel overnight in a muffle furnace at 600° C. will ordinarily remove only ½–⅔ of its adsorbed water. However, whatever water is not removed by preliminary heating is eventually nearly all removed by hydrolytic reactions with reactants on the silica, yielding $NH_3$ and $CO_2$.

Wherever a silica gel is specified in this specification, it is to be understood that this refers to these well known materials as such and also as materials which are representative members of the general class of inert inorganic, heat-stable, porous, adsorbent metallic oxide gel catalytic materials described as suitable in this section.

In some cases, coating the catalyst with a heavy metal oxide, e. g., silver, copper, iron, etc., in the well-known way, permits the use of lower temperatures.

We claim:
1. A method of preparing a reaction mass comprising cyanamide which comprises forming a vapor mixture containing HCN and oxygen and subjecting said mixture to the action of an activated metallic oxide gel catalyst maintained at a temperature of at least 450° C., whereby cyanamide is deposited on said gel and recovering resultant cyanamide.

2. A process according to claim 1 in which the gel is a silica gel.

3. The method of preparing melamine which comprises forming a vapor mixture containing HCN, ammonia and oxygen, subjecting a stream of said vapor mixture to the action of an activated, metallic oxide gel catalyst at a temperature within the range from about 350° C. to about 450° C., whereby melamine forms on said gel and is sublimed into the vapor stream and subsequently condensing sublimed melamine therefrom.

4. A process according to claim 3 in which the gel is a silica gel.

References Cited in the file of this patent

UNITED STATES PATENTS 2,524,018   Mackay _____ Sept. 26, 1950